(No Model.)
W. C. EDGE.
KNITTED CHAIN.
No. 416,259. Patented Dec. 3, 1889.
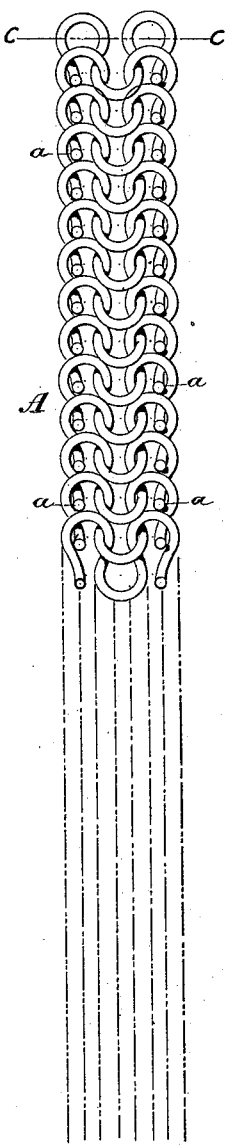
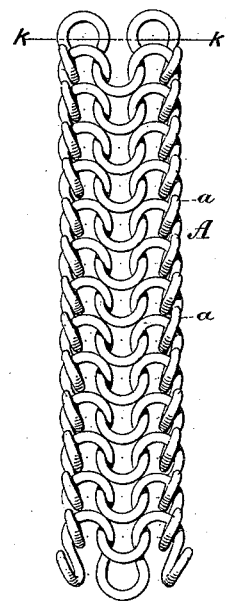
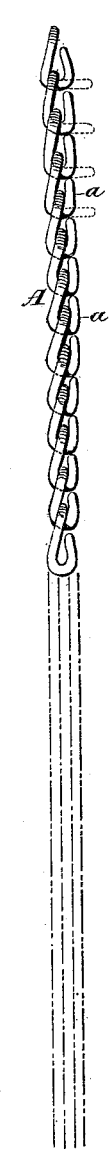
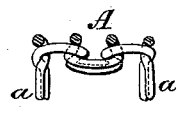
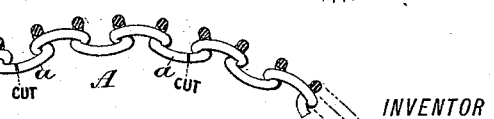
WITNESSES:
INVENTOR
ATTORNEYS

UNITED STATES PATENT OFFICE.

WILLIAM C. EDGE, OF NEWARK, NEW JERSEY.

KNITTED CHAIN.

SPECIFICATION forming part of Letters Patent No. 416,259, dated December 3, 1889.

Application filed March 12, 1889. Serial No. 302,990. (No model.)

*To all whom it may concern:*

Be it known that I, WILLIAM C. EDGE, of the city of Newark, in the county of Essex and State of New Jersey, have invented certain new and useful Improvements in Knitted Chains, of which the following is a specification.

This invention has for its object to produce from an endless knitted-wire fabric, such as is produced by the machinery described in my patent, No. 242,616, of June 7, 1881, chains or belts of greater or less width with smooth edges.

Endless wire fabrics such as are described in my aforesaid Letters Patent can be cut into strips of greater or less width for the purpose of being used as belts or chains, but when so cut produce rough or ragged edges, which are objectionable.

My invention consists in a knitted-wire chain or belt having the ends of the wires of which it is composed turned up along one face of the chain, as hereinafter specified.

Reference is to be had to the accompanying drawings, forming part hereof, in which Figure 1 represents a face view of a chain partly finished according to my invention. Fig. 2 is an edge view of the same. Fig. 3 is a face view of the completed chain. Fig. 4 is an edge view of the same. Fig. 5 is a cross-section on the line $c\,c$, Fig. 1. Fig. 6 is a cross-section on the line $k\,k$, Fig. 3; and Fig. 7 is a cross-section of part of an endless knitted fabric from which my new chain is made.

Starting with Fig. 7, which is supposed to illustrate part of the complete tubular wire knitted fabric, such as my aforesaid patent, No. 242,616, should produce, that section of said fabric which is marked A is to furnish a wire belt or chain. It is therefore separated from the wire tube by incisions or cuts running the whole length of the tube, or as far as necessary for the length of chain desired, and passing through the links $a\,a$. The result of this incision will be a wire belt A, having laterally-projecting extensions $a$, which would form sharp or ragged edges on the chain or belt. These ragged edges I desire to avoid, or, rather, to convert into smooth edges. To this end I first bend in appropriate machinery all these laterally-projecting ends $a\,a$, so that they stand at right angles from the face of the wire belt A, as is more clearly shown in Figs. 2 and 5 of the drawings. A comparison of Fig. 5 with Fig. 7 will show to what extent the ends $a$ have been bent. Having obtained the form shown in Figs. 2 and 5, I next bend these ends $a$ one toward the other along and against the face of the wire chain or belt, as shown in Fig. 4—that is to say, from the dotted position of the ends $a$ shown in Fig. 4 I carry them into the full-line position shown in that figure, and thus conceal the ends $a$, so that they shall no longer project from the edges of the chain, leaving said edges rounded and smooth.

Chains of this construction may be used in lieu of sash-cords, as belts, as dog-collars, and, in fact, wherever chains or belts are now used.

Having thus described my invention, what I claim is—

As an improved article of manufacture, a knitted-wire chain or belt A, having the ends $a$ of its wire sections turned in the same direction and substantially parallel with the edge of the belt or chain, substantially as herein shown and described.

WILLIAM C. EDGE.

Witnesses:
    F. N. JOHNSON,
    W. B. ADAMS.